Nov. 1, 1955  M. E. HOLMES  2,722,196
CYLINDRICAL CHARTS FOR WEIGHING SCALES
Filed April 5, 1954  3 Sheets-Sheet 1
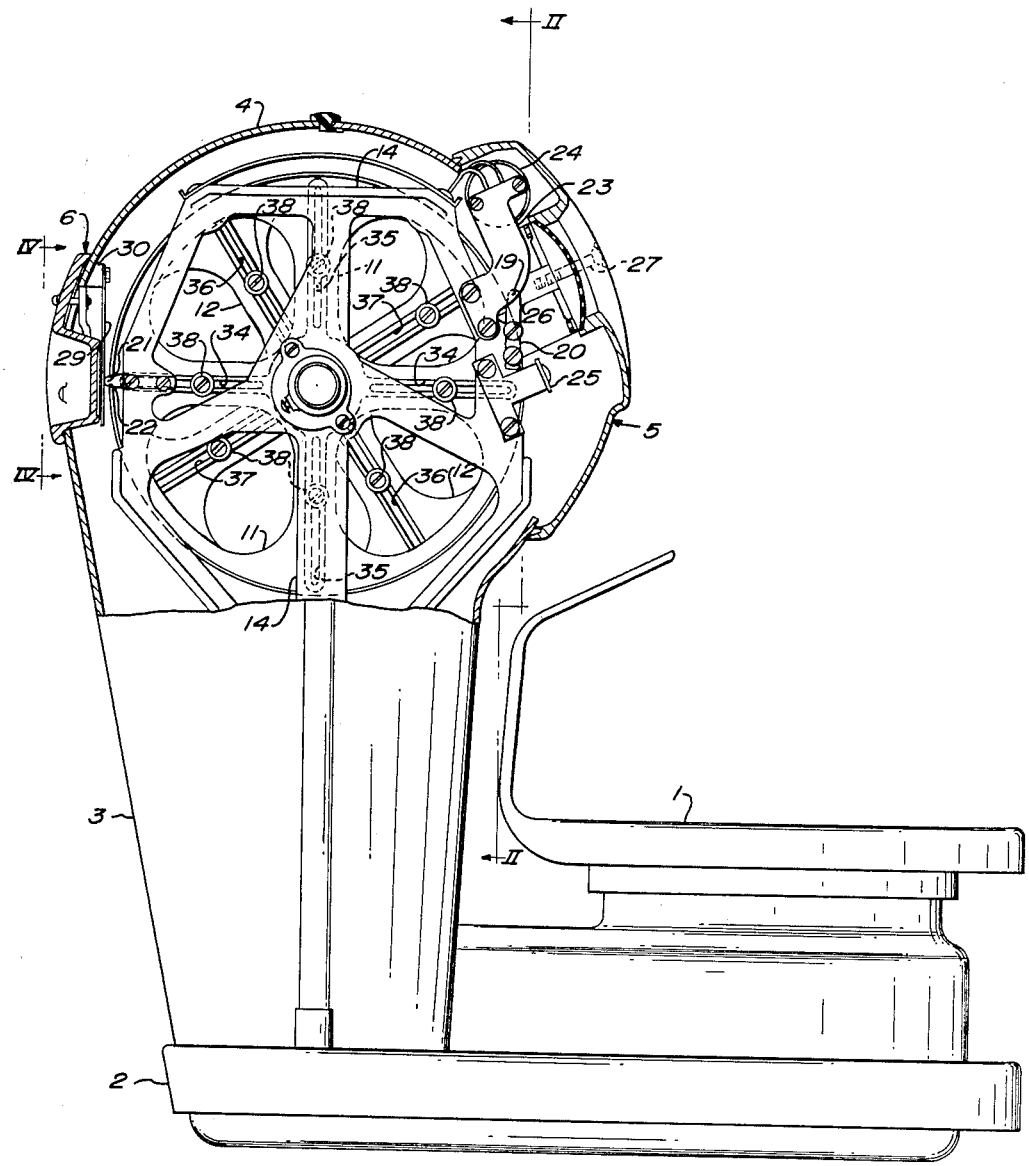
Fig. I
INVENTOR.
MERRELL E. HOLMES
BY
Marshall, Marshall & Yeasting
ATTORNEYS Nov. 1, 1955    M. E. HOLMES    2,722,196
CYLINDRICAL CHARTS FOR WEIGHING SCALES
Filed April 5, 1954    3 Sheets-Sheet 2
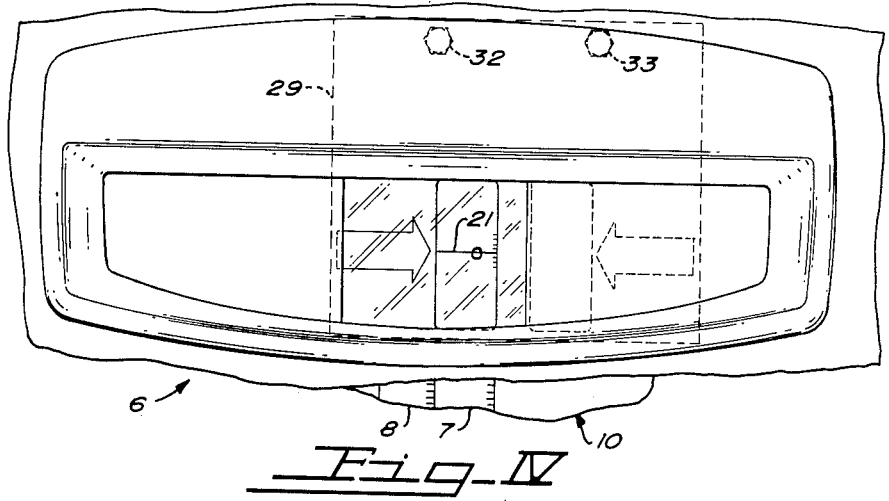
Fig. IV
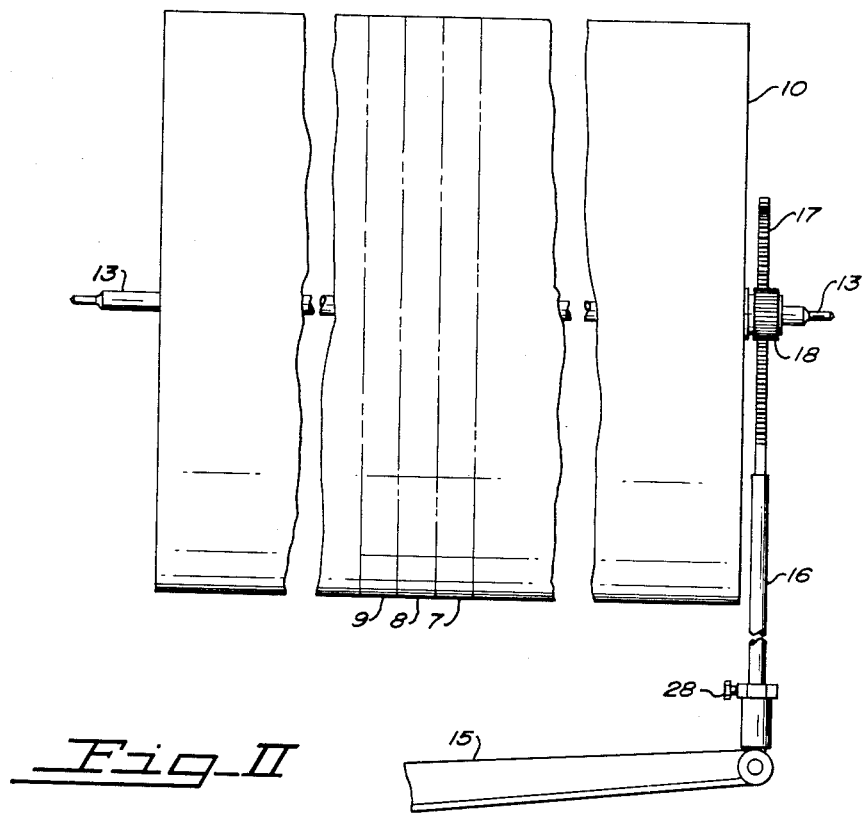
Fig. II
INVENTOR.
MERRELL E. HOLMES
BY
Marshall, Marshall & Yeasting
ATTORNEYS

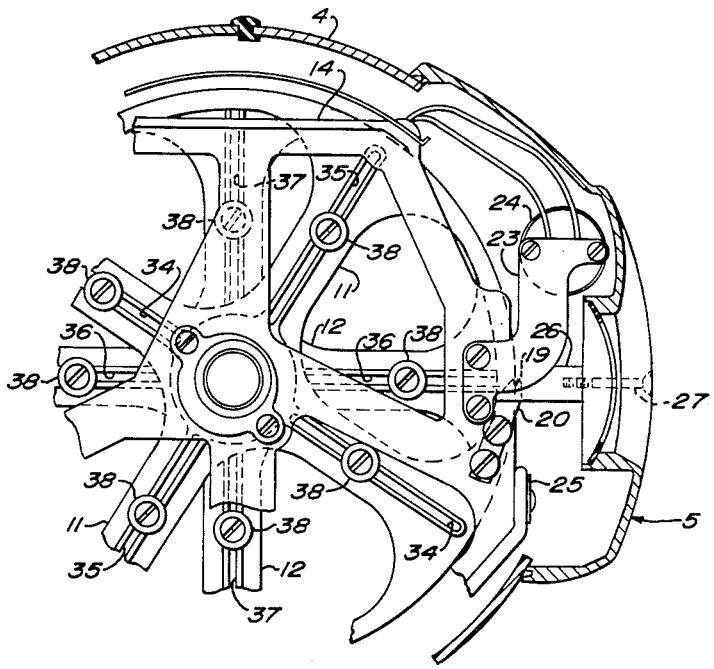
Fig. III
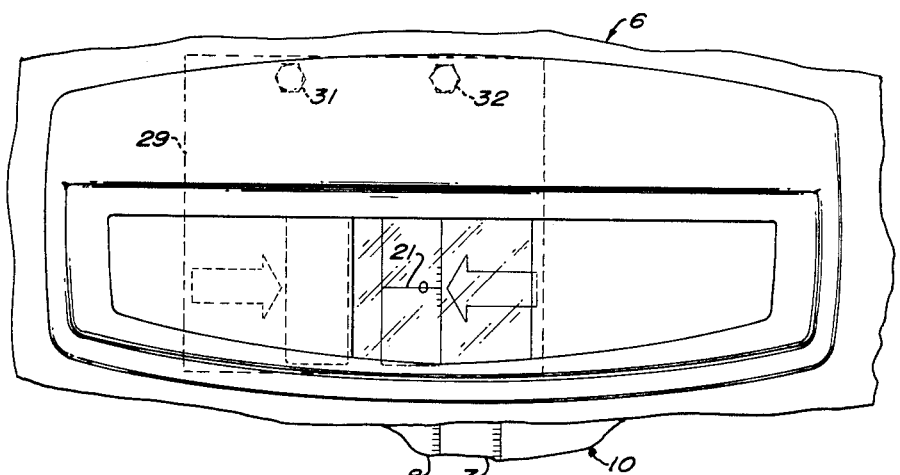
Fig. V
INVENTOR.
MERRELL E. HOLMES

United States Patent Office 2,722,196
Patented Nov. 1, 1955

2,722,196

CYLINDRICAL CHARTS FOR WEIGHING SCALES

Merrell E. Holmes, Wilmington, Del., assignor to Toledo Scale Company, Toledo, Ohio, a corporation of New Jersey Application April 5, 1954, Serial No. 420,864

3 Claims. (Cl. 116—129)

This invention relates to weighing scales and in particular to improved indicating and viewing mechanism for computing scales of the cylinder chart type.

In this type of weighing scale the chart is made of a cylindrically shaped sheet of indicia bearing material and is supported by a plurality of spiders mounted on a shaft forming the axis of rotation for the chart. The shaft cooperates with the weighing mechanism and is rotated in proportion to the load offsetting force applied when weighing an article.

Different styles of cylinder scales have been constructed for use on different height counters and it is desirable to so construct each scale that the angle from which the scale can be read may be varied to accommodate the scale to the height of the operator or to the particular height of a counter in the store where it is used.

Cylinder scale charts have a plurality of columns of weight indicia to provide weight indications visible to the merchant on one side of the scale and to the customer on the other side of the scale. Heretofore, the varying of the angle from which the scale could be read, e. g., changing a horizontal reading scale to an angle reading scale, made it necessary to construct charts for each variation so that the chart would simultaneously indicate the correct weight on both sides of the scale.

The construction of charts for each variation in the angle from which the scale can be read has caused high manufacturing costs and has made necessary large consignment and warehouse stocks.

The principal object of this invention is to provide a chart for a cylinder scale which is visible on both sides of the scale and which is interchangeable in scales having different angles from which their charts can be read.

Another object of the invention is to provide, in a cylinder scale, a chart assembly having improved balancing means and which is visible on both sides of the scale and which assembly is interchangeable in scales having different angles from which their charts can be read.

Another object of the invention is to provide improved means for selectively changing the angle from which a cylinder scale chart can be read and a chart assembly which is interchangeable for use with the variation of said angle.

More specific objects and advantages are apparent from the following description of a preferred embodiment of the invention.

According to the invention, an indicia bearing member having merchant weight indicia, a pair of customer columns of weight indicia, and indicia of computed values is mounted in a frame, the member and the frame being enclosed by a housing. Means are provided for balancing the member and a positionable indicia viewing assembly is mounted on the housing for angular and for horizontal indication of the merchant weight indicia and indicia of computed values. Means are provided for adjusting the indicia bearing member so that the merchant weight indicia will indicate zero when the positionable indicia viewing assembly is in either position and when no load is on the weighing scale. A fixed indicia viewing assembly is mounted on the housing for indication of the pair of customer columns of weight indicia, the pair of customer columns of weight indicia cooperating with the fixed indicia viewing assembly so that one column of customer weight indicia indicates zero when the positionable indicia viewing assembly is mounted for horizontal indication and when the indicia bearing member is adjusted so that the merchant weight indicia indicates zero and the other column of customer weight indicia indicates zero when the positionable indicia viewing assembly is mounted for angular indication and when the indicia bearing member is adjusted so that the merchant weight indicia indicates zero. A positionable mask is provided for revealing only that one of the customer columns of weight indicia which indicates zero when no load is on the weighing scale.

A preferred embodiment of the invention is illustrated in the accompanying drawings.

In the drawings:

Figure I is an end elevational view, with part of the housing broken away and parts shown in section, to illustrate the indicating and viewing mechanism of a weighing scale constructed according to the invention.

Figure II is a fragmentary elevational view of the chart assembly and weighing mechanism as seen from the line II—II of Figure I with the viewing assembly and the scale housing removed.

Figure III is a fragmentary end elevational view, partly in section, of the indicating and viewing mechanism as shown in Figure I with the viewing mechanism in horizontal position.

Figure IV is a fragmentary elevational view of the customer's indication as seen from the line IV—IV of Figure I showing means for masking one of the columns of customer weight indicia.

Figure V is a fragmentary elevational view of the customer's indication as illustrated in Figure IV with the means for masking shifted to another position.

These specific figures and the accompanying description are intended merely to illustrate the invention but not to impose limitations on the claims.

Figure I shows a computing weighing scale of the cylinder chart type. Such a scale comprises a load receiver 1 supported from the load pivots of a main lever fulcrumed within a base 2 of the scale. A column 3 erected from one end of the base 2 is surmounted by a cylindrical chart housing 4 provided with a positionable indicia viewing assembly 5 through which a merchant may read the scale and a fixed indicia viewing assembly 6 through which a customer may observe the weight indication. A plurality of columns of weight indicia, i. e. a pair of customer columns of weight indicia 7 and 8 and merchant weight indicia 9 (Figure II), and indicia of computed values are printed on a cylindrical indicia bearing member or chart 10 supported on spiders 11 and 12 carried on an indicator shaft 13 journalled in ball bearings mounted in end frames 14 which are supported from within the chart housing 4. The end frames 14, there being one at each end of the chart 10, form the upper parts of the weighing scale.

The chart 10 is driven by a transverse chart drive lever 15 (Figure II) operatively connected to the main lever of the scale. The lever 15 is pivotally connected at its free end to a rack rod 16 the upper end of which carries a spring-loaded rack 17 cooperating with a pinion 18 on the shaft 13. A thread 19 that is stretched between mounting clamps 20 carried in the end frames 14 serves as a reading line against which the indicia within the field of view of the positionable viewing assembly 5 may be read and a thread 21 that is stretched between mounting clamps 22 carried in the end frames 14 serves as a reading line against which the indicia within the field of view of the fixed viewing assembly 6 may be read. The chart 10 is rotated through angles proportional to the loads applied to the load receiver 1.

The positionable indicia viewing assembly 5 is constructed so as to make it possible to use the same assembly 5 for angular and for horizontal indication of the merchant weight indicia 9 and indicia of computed values. Figure I shows the positionable indicia viewing assembly 5 mounted for angular indication. The angle from which the weighing scale can be read by the merchant may be varied to accommodate the scale to the particular height of a counter or to the height of the merchant by inverting the viewing assembly 5 for horizontal indication as shown in Figure III. When the viewing assembly 5 is inverted from its position shown in Figure I to its position shown in Figure III, the mounting clamps 20 carrying the thread 19, the lamp brackets 23 carrying a lamp 24, and a price bar 25 must be changed from their positions on the end frames 14 shown in Figure I to their positions on the end frames 14 shown in Figure III. The lamp brackets 23, there being one mounted on each of the end frames 14 at each end of the chart 10, each carry a finger 26. The viewing assembly 5 is attached to the fingers 26 by means of screws 27. When the lamp brackets 23 are mounted for angular indication as shown in Figure I, the fingers 26 are tilted upward from the horizontal to receive the screws 27 in a position to orient the viewing assembly 5 for angular indication. When the lamp brackets 23 are mounted for horizontal indication as shown in Figure III, the fingers 26 are in a horizontal position to orient the inverted viewing assembly 5 for horizontal indication. The interchangeable positionable indicia viewing assembly 5 makes it possible to use the same parts for either angle or horizontal reading scales to standardize parts at the factory and to reduce consignment and warehouse stocks.

Means are provided for adjusting the chart 10 so that the merchant weight indicia 9 will indicate zero when the positionable indicia viewing assembly 5 is in either angular or horizontal position and when no load is on the weighing scale. When the position of the viewing assembly 5 is changed, the spring-loaded rack 17 is disengaged from the pinion 18 by means of finger pressure and the shaft 13 is rotated to roughly adjust the zero indicium of the merchant weight indicia 9 with its cooperating reading line thread 19. A fine adjustment is then made by loosening a set screw 28 located at the base of the rack rod 16, raising or lowering the rack rod 16, and then re-tightening the set screw 28.

Heretofore, if a cylindrical chart was adjusted to compensate for a changed position of a viewing assembly for merchant weight indicia, the single customer column of weight indicia heretofore used on cylindrical charts, which is viewed from the opposite side of the scale from the merchant weight indicia, would be out of adjustment. The present improved indiciating mechanism includes a chart having two customer columns of weight indicia 7 and 8, one column being used when the positionable viewing assembly 5 is in one position and the other column being used when the positionable viewing assembly 5 is in its other position. Thus, the chart 10 is interchangeable for use with either horizontal or angle reading scales. The standardized chart 10 reduces manufacturing costs and reduces the number of charts needed for consignment and warehouse stocks.

When the positionable indicia viewing assembly 5 is mounted for angular indication and when the chart 10 is adjusted as hereinbefore described so that the merchant weight indicia 9 indicate zero when no load is on the weighing scale, the customer column 7 of weight indicia indicates zero (Figure IV). When the positionable indicia viewing assembly 5 is mounted for horizontal indication and when the chart 10 is adjusted as hereinbefore described so that the merchant weight indicia 9 indicate zero when no load is on the weighing scale, the customer column 8 of weight indicia indicates zero (Figure V). A positionable mask 29 within the fixed indicia viewing assembly 6 is provided for revealing only that one of the customer colums 7 and 8 of weight indicia which indicates zero when no load is on the weighing scale. The mask 29 is attached to a boss 30 formed on the inside of the chart housing 4. The boss 30 has three tapped equally-spaced apart holes 31, 32, and 33 and the mask 29 has a pair of holes which register with any two adjacent holes of the boss. The mask 29 is held by means of screws in holes 31 and 32 in one position and is changed to its other position by removing the screws, shifting the mask 29 horizontally so that the pair of cooperating holes of the mask coincide with the holes 32 and 33 of the boss 30, and then re-inserting the screws.

It is usual in computing weighing scales of the cylinder chart type to provide a plurality of weights slidably mounted in a plurality of tracks formed in the crisscrossed arms of the chart spiders for balancing the cylindrical chart. This is necessary to provide means for adjusting the chart so that it will indicate correctly when the weighing scale is loaded to one-quarter capacity (it is usual to provide other means for adjusting the chart at zero, half, three-quarter, and full capacity). Heretofore, the spiders, there being one at each end of the chart, were similarly mounted on an indicator shaft, each spider having one arm carrying a plurality of weights substantially horizontal and the other arm carrying a plurality of weights substantially vertical when no load was on the weighing scale. When the weighing scale was loaded to one-quarter capacity, the cylindrical chart rotated through an angle of 90° and the horizontal arm changed to a vertical position and the vertical arm changed to a horizontal position. The important fact being that when the weighing scale was loaded to one-quarter capacity, one of the arms of each of the spiders was substantially horizontal so that movement of the weights in the substantially horizontal tracks formed in the crisscrossed arms would cause the cylindrical chart to be tipped up or down to adjust the scale so that it would indicate correctly under the influence of a one-quarter capacity load. Such an arrangement is impossible in the computing weighing scales of the present type, since when the chart 10 is adjusted, as hereinbefore described, so that the merchant weight indicia 9 indicate zero when the position of the positionable indicia viewing assembly 5 is changed and when no load is on the load receiver 1, the adjustment or rotation of the chart 10 would cause similarly mounted spiders to no longer have an arm in a substantially horizontal position, and an arm must be in a substantially horizontal position so that movement of the weights along a substantially horizontal arm will tip the chart up or down to accurately aline the zero indicium of the chart with its cooperating reading line.

The present improved indicating mechanism includes the pair of spiders 11 and 12, formed from pairs of criss-crossed arms, fixed on the indicator shaft 13 so that one spider is in a 45 degree turned relationship to the other spider. In this arrangement the spider 11 is mounted within the chart housing 4 so that a plurality of tracks 34 formed in an arm of the spider 11 are in a substantially horizontal position and a plurality of tracks 35 formed in the other arm of the spider 11 are in a substantially vertical position when the positionable indicia viewing assembly 5 is mounted for angular indication and when the chart 10 is adjusted so that the merchant weight indicia 9 indicate zero when no load is on the scale, as shown in Figure I. A plurality of tracks 36 formed in an arm of the spider 12 which is fixed on the indicator shaft 13 in a 45 degree turned relationship to the spider 11 are in a substantially horizontal position and a plurality of tracks 37 formed in the other arm of the spider 12 are in a substantially vertical position when the positionable indicia viewing assembly 5 is mounted for horizontal indication and when the chart 10 is adjusted so that the merchant weight indicia 9 indicate zero when no load is on the scale, as shown in Figure III. Thus, the spiders 11 and 12 are so oriented, when no load is on the weighing scale, that a plurality of tracks of one spider or the other spider are in a substantially horizontal position for each position of the positionable indicia viewing assembly 5 and the rotation of the chart 10 through an angle of 90° under the influence of a one-quarter capacity load upon the load receiver 1 positions a plurality of tracks of one spider or the other spider in a substantially horizontal position for each position of the positionable indicia viewing assembly 5. To adjust the weighing scale so that it will indicate correctly when the scale is loaded to one-quarter capacity, the chart 10 is balanced by movement of those weights of the plurality of weights 38, carried by the plurality of tracks 34, 35, 36 and 37, which are carried by those tracks of the plurality of tracks which are in a substantially horizontal position. One of the plurality of tracks is in a substantially horizontal position for each position of the positionable indicia viewing assembly 5 when there is no load on the weighing scale and when there is a one-quarter capacity load on the weighing scale.

The embodiment of the invention which has been described may be modified to meet various requirements.

Having described the invention, I claim:

1. In a weighing scale, in combination, an indicia bearing member having a plurality of columns of weight indicia, a frame supporting the member, a housing enclosing the frame and the member, a positionable indicia viewing assembly mounted on the housing for viewing certain of said plurality of columns of weight indicia, means for positioning said positionable indicia viewing assembly, a fixed indicia viewing assembly mounted on the housing for viewing the remainder of the plurality of columns of weight indicia, the zero indications presented by said remainder of the columns being displayed at the same elevation, means for masking all except one of the columns of weight indicia within the field of view of said fixed indicia viewing assembly, a plurality of weights for balancing the indicia bearing member, and a plurality of tracks in each end of the indicia bearing member for carrying the plurality of weights, there being at least one of said plurality of tracks which when there is no load on the scale is in a substantially horizontal position for each position of said positionable indicia viewing assembly.

2. In a weighing scale, in combination, an indicia bearing member having a plurality of columns of weight indicia, a frame supporting the member, a housing enclosing the frame and the member, a positionable indicia viewing assembly mounted on the housing for viewing certain of said plurality of columns of weight indicia, means for positioning said positionable indicia viewing assembly, means for adjusting the indicia bearing member so that the weight indicia within the field of view of the positionable indicia viewing assembly indicate zero when no load is on the weighing scale, a fixed indicia viewing assembly mounted on the housing for viewing the remainder of the plurality of columns of weight indicia, the zero indications presented by said remainder of the columns being displayed at the same elevation, means for masking all except one of the columns of weight indicia within the field of view of said fixed indicia viewing assembly, a plurality of weights for balancing the indicia bearing member, and a plurality of tracks in each end of the indicia bearing member for carrying the plurality of weights, there being at least one of said plurality of tracks which when there is no load on the scale is in a substantially horizontal position for each position of said positionable indicia viewing assembly.

3. In a weighing scale, in combination, an indicia bearing member having a plurality of columns of weight indicia, a frame supporting the member, a housing enclosing the frame and the member, a positionable indicia viewing assembly mounted on the housing for viewing certain of said plurality of columns of weight indicia, means for positioning said positionable indicia viewing assembly, a fixed indicia viewing assembly mounted on the housing for viewing the remainder of the plurality of columns of weight indicia, the zero indications presented by said remainder of the columns being displayed at the same elevation, a positionable mask attached to the housing and located between the housing and the indicia bearing member to conceal all except one of the columns of weight indicia within the field of view of said fixed indicia viewing assembly, a plurality of weights for balancing the indicia bearing member, and a plurality of tracks in each end of the indicia bearing member for carrying the plurality of weights, there being at least one of said plurality of tracks which when there is no load on the scale is in a substantially horizontal position for each position of said positionable indicia viewing assembly.

References Cited in the file of this patent

UNITED STATES PATENTS

| | | |
|---|---|---|
| 2,272,150 | Hem | Feb. 3, 1942 |
| 2,315,710 | King | Apr. 6, 1943 |
| 2,669,154 | Williams | Feb. 16, 1954 |